United States Patent
Kikitsu et al.

(10) Patent No.: US 6,894,857 B2
(45) Date of Patent: May 17, 2005

(54) MAGNETIC RECORDING APPARATUS AND METHOD OF DESIGNING THE SAME

(75) Inventors: Akira Kikitsu, Yokohama (JP); Junichi Akiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 537 days.

(21) Appl. No.: 09/953,264

(22) Filed: Sep. 17, 2001

(65) Prior Publication Data

US 2002/0057511 A1 May 16, 2002

(30) Foreign Application Priority Data

Sep. 28, 2000 (JP) ........................................ 2000-296835

(51) Int. Cl.$^7$ .............................. G11B 5/02; G11B 5/09
(52) U.S. Cl. .............................. 360/59; 360/55; 360/31; 369/13.01; 369/47.1; 369/47.15; 369/13.09
(58) Field of Search .............................. 360/59, 55, 31, 360/13.09; 369/13.01, 116, 47.15, 47.1, 53.2

(56) References Cited

U.S. PATENT DOCUMENTS

| | | | |
|---|---|---|---|
| 6,143,436 A | 11/2000 | Nakajima et al. | ........... 360/110 |
| 6,307,817 B1 * | 10/2001 | Tsuboi | ..................... 369/13.17 |
| 6,636,460 B2 * | 10/2003 | Akiyama et al. | ........ 369/13.14 |

FOREIGN PATENT DOCUMENTS

EP    1 037 198    9/2000

OTHER PUBLICATIONS

J. J.M. Ruigrok, et al., Journal of Applied Physics, vol. 87, No. 9, pps. 5398–5403, "Disk Recording Beyond 100 Gb/in.$^2$: Hybrid Recording? (INVITED)," May 1, 2000.

S. H. Charap, et al., IEEE Transactions on Magnetics, vol. 33, No. 1, pps. 978–983, "Thermal Stability of Recorded Information at High Densities," Jan. 1, 1997.

D. Weller, et al., IEEE Transactions on Magnetics, vol. 35, No. 6, pps. 4423–4439, "Thermal Effect Limits in Ultra-high–Density Magnetic Reocording," Nov. 1999.

* cited by examiner

*Primary Examiner*—David Hudspeth
*Assistant Examiner*—Natalia Figueroa
(74) *Attorney, Agent, or Firm*—Oblon, Spivak, McClelland, Maier & Neustadt, P.C.

(57) ABSTRACT

A method of designing a thermally-assisted magnetic recording apparatus having a magnetic recording medium, a heater and a magnetic head includes, determining a stable retention time $t_{st}$ for recorded magnetization and a thermal-fluctuation stability coefficient $\beta_{st}$ calculated from $\beta(T) = K_u V/k_B T$, where $K_u$ is a magnetic anisotropy energy density, V is an activation volume, and $k_B$ is Boltzmann's constant, obtaining an equivalent degradation time $t_{EQ}$ calculated from $t_{EQ} = \Sigma(\Delta t_{EQ})$, that sums values of $\Delta t_{EQ}$ within a period of time $\Delta t$ for a time span during which the medium is substantially degraded, where $\Delta t_{EQ} = \exp(\ln(\Delta t) - \beta - \beta_{st})$ and $\beta$ is a thermal-fluctuation stability coefficient for a medium temperature T in $\Delta t$, and determining specifications of the medium, the heater and the magnetic head in a manner to meet the relationship of $t_{EQ} < t_{st}$.

16 Claims, 5 Drawing Sheets

MAGNETIC RECORDING APPARATUS AND METHOD OF DESIGNING THE SAME

CROSS-REFERENCE TO RELATED APPLICATIONS

This application is based upon and claims the benefit of priority front the prior Japanese Patent Application Ser. No. 2000-296835, filed Sep. 28, 2000, the entire contents of which are incorporated herein by reference.

BACKGROUND OF THE INVENTION

1. Field of the Invention

The present invention relates to a magnetic recording apparatus and a method of designing the same.

2. Description of the Related Art

With improvement in the processing speed of computers achieved in recent years, high-density recording has been required for magnetic recording apparatuses (HDD) for recording and reproducing information. However, there is a physical limit in the magnetic recording density.

In order to achieve high-density magnetic recording, it is necessary to reduce the size of magnetic domains recorded in the magnetic recording layer. For distinguishing each recorded small magnetic domain clearly, it is necessary for the domain boundaries to be smooth. For making the domain boundaries smooth, it is necessary for the magnetic particles to be small and to be separated magnetically each other. It is also necessary to decrease the thickness of the magnetic recording layer in order to reduce the magnetization transition width. Therefore, it is necessary to reduce the size of grains of a magnetic material, which are magnetically independent each other, forming the magnetic recording layer. However, if the magnetic particles are made very small, magnetic anisotropy energy, i.e., the product of magnetic anisotropy energy density $K_u$ and magnetic particle volume, is rendered smaller than thermal fluctuation energy, with the result that it is impossible to maintain the direction of the spin once recorded. This is called a thermal fluctuation limit or a super-paramagnetic limit.

In order to avoid the thermal fluctuation, it is effective to increase the value of $K_u$. However, since coercive force Hc is substantially proportional to $K_u$, a large recording magnetic field is required for achieving a sufficient recording in such a medium. It should be noted in this connection that the characteristics of a head magnetic pole material determining the recording magnetic field have substantially reached already a physical limit, making it unreasonable to expect a further improvement in the recording magnetic field. In other words, it is impossible to comply with the demands for the increased recording density by simply increasing $K_u$.

Under the circumstances, proposed is a magnetic recording apparatus of a so-called "thermally-assisted magnetic recording system", in which recording is performed by applying a magnetic field while the magnetic recording medium is being heated. Since, the magnetic recording apparatus of this type includes a heating means in addition to the construction of the conventional magnetic recording apparatus, the number of parameters for designing the apparatus is increased. It follows that tremendous work is necessary if the apparatus is designed through the large number of read/write tests of many trial manufactures of the apparatus.

BRIEF SUMMARY OF THE INVENTION

An object of the present invention is to provide a magnetic recording apparatus capable of achieving a high-density recording exceeding the thermal fluctuation limit. Another object of the present invention is to provide a method that permits easily designing a magnetic recording apparatus capable of achieving a high-density recording exceeding the thermal fluctuation limit.

According to a first aspect of the present invention, there is provided a magnetic recording apparatus, comprising:

a magnetic recording medium having a magnetic recording layer, the medium being required to have a stable retention time $t_{st}$ for recorded magnetization at room temperature and having a thermal-fluctuation stability coefficient $\beta_{st}$ at room temperature calculated from a thermal-fluctuation stability coefficient $\beta(T)$ at an absolute temperature T, expressed by the following equation:

$$\beta(T) = K_u V / k_B T,$$

where $K_u$ is a magnetic anisotropy energy density, V is an activation volume, and $k_B$ is Boltzmann's constant, and the medium showing an equivalent degradation time $t_{EQ}$ calculated from the following equation:

$$t_{EQ} = \Sigma(\Delta t_{EQ}),$$

that sums values of $\Delta t_{EQ}$ within a given period of time $\Delta t$ for a time span during which the medium is kept at a temperature at which the recorded magnetization is substantially degraded, where $\Delta t_{EQ}$ is defined by the following equation:

$$\Delta t_{EQ} = \exp(\ln(\Delta t) - \beta + \beta_{st}),$$

where $\beta$ is a thermal-fluctuation stability coefficient for a medium temperature T in the period of time $\Delta t$, wherein the relationship of $t_{EQ} < t_{st}$ is met between the stable retention time $t_{st}$ for recorded magnetization at room temperature and the equivalent degradation time $t_{EQ}$;

a heater configured to heat the medium; and a magnetic head configured to apply a magnetic field to the medium.

According to another aspect of the present invention, there is provided a method of designing a magnetic recording apparatus including a magnetic recording medium having a magnetic recording layer, a heater configured to heat the medium and a magnetic head configured to apply a magnetic field to the medium, comprising:

determining a stable retention time $t_{st}$ for recorded magnetization at room temperature and a thermal-fluctuation stability coefficient $\beta_{st}$ at room temperature calculated from a thermal-fluctuation stability coefficient $\beta(T)$ at an absolute temperature T, expressed by the following equation:

$$\beta(T) = K_u V / k_B T,$$

where $K_u$ is a magnetic anisotropy energy density, V is an activation volume, and $k_B$ is Boltzmann's constant;

obtaining an equivalent degradation time $t_{EQ}$ calculated from the following equation:

$$t_{EQ} = \Sigma(\Delta t_{EQ}),$$

that sums values of $\Delta t_{EQ}$ within a given period of time $\Delta t$ for a time span during which the medium is kept at a temperature at which the recorded magnetization is substantially degraded, where $\Delta t_{EQ}$ is defined by the following equation:

$$\Delta t_{EQ} = \exp(\ln(\Delta t) - \beta - \beta_{st}),$$

where β is a thermal-fluctuation stability coefficient for a medium temperature T in the period of time Δt; and determining specifications of the magnetic recording medium, the heater and the magnetic head in a manner to meet the relationship of $t_{EQ} < t_{st}$ between the stable retention time $t_{st}$ for recorded magnetization at room temperature and the equivalent degradation time $t_{EQ}$.

DETAILED DESCRIPTION OF THE INVENTION

Figure 1:
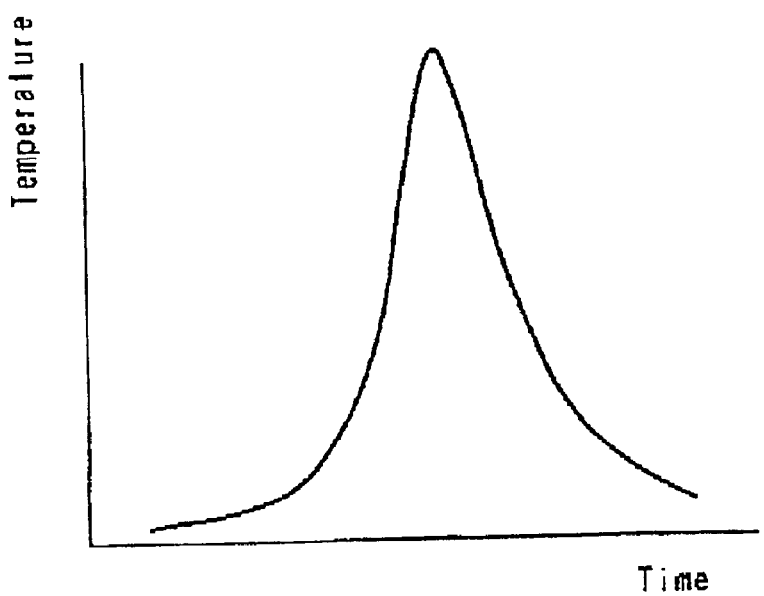
FIG. 1 is a graph schematically showing the temperature change with time of a magnetic recording medium.

The present invention will now be described in detail.

The present invention is directed to a magnetic recording apparatus of a so-called "thermally-assisted magnetic recording system" in which recording is performed by applying a magnetic field while the magnetic recording medium is being heated, comprising a magnetic recording medium having a magnetic recording layer, a heater configured to heat the medium, and a magnetic head configured to apply a magnetic field to the medium. The magnetic recording apparatus according to one aspect of the present invention satisfies a stable retention time $t_{st}$ of the recorded magnetization required at room temperature. Also, in the method of designing a magnetic recording apparatus according to another aspect of the present invention, the specifications of the magnetic recording medium, the heater and the magnetic head are easily determined in a manner to satisfy the required stable retention time $t_{st}$ of the recorded magnetization.

A magnetic material having a relatively high saturation magnetization Is and a high magnetic anisotropy is adapted for use for forming the magnetic recording layer included in the magnetic recording apparatus of the present invention. Such being the situation, used is an alloy comprising at least one metal material selected from the group consisting of Co, Pt, Sm, Fe, Ni, Cr, Mn, Bi and Al. In particular, it is desirable to use a Co-based alloy having a high crystal magnetic anisotropy such as alloys based on CoPt, SmCo, and CoCr. To be more specific, the magnetic material includes, for example, Co—Cr, Co—Pt, Co—Cr—Ta, Co—Cr—Pt, Co—Cr—Ta—Pt, Co and Fe. It is also possible to select the magnetic material from a wide range of materials including rare earth-transition metal alloys, ordered alloys, and magnetic oxides, such as Tb—Fe, Te—Fe—Co, Tb—Co, Gd—Tb—Fe—Co, Gd—Dy—Fe—Co, Nd—Fe—Co, Nd—Tb—Fe—Co, PtMnSb, FePt, Co ferrite, and Ba ferrite. Further, it is possible to form an alloy by adding at least one element selected from the group consisting of Fe and Ni to the magnetic materials described above for controlling the magnetic properties. It is also possible to add an additive for improving the magnetic properties to the metals or the alloys noted above, said additive including, for example, Cr, Nb, V, Ta, Ti, W, Hf, Cr, In, Si and B as well as a compound between these elements and at least one additional element selected from the group consisting of oxygen, nitrogen, carbon and hydrogen. It is possible for the magnetic anisotropy of the magnetic recording layer to be any of the longitudinal magnetic anisotropy employed in the conventional HDD the perpendicular magnetic anisotropy employed in the magneto-optical recording and a mixture thereof. Also, it is possible to use a stacked structure consisting of a magnetic layer and a nonmagnetic layer as the magnetic recording layer. It is possible for the stacked structure to allow the entire magnetic recording layer to exhibit ferrimagnetic properties or antiferromagnetic properties depending on the stacked state. However, the particular stacked structure is desirable in some cases in that, for example, the effective volume is increased for preventing the thermal fluctuation, and that the particular stacked structure does not degrade the high-resolution recording in the recording step. Of course, it is possible to use a ferrimagnetic material or an antiferromagnetic material that does not have a stacked structure.

It is possible to use a metal, glass and a ceramic material for forming a substrate supporting the magnetic recording layer of the present invention. Incidentally, it is possible to arrange an underlayer formed of a magnetic or nonmagnetic material between the substrate and the magnetic recording layer. The underlayer formed of a magnetic material is magnetically coupled with the magnetic domains within the magnetic thin film or with a recording-reproducing head through exchange interaction or magnetostatic interaction for improving the read/write characteristics. Where the magnetic underlayer is provided in a manner to achieve the exchange coupling with the magnetic domains, the domains are stabilized by using a magnetic underlayer whose magnetization is unlikely to be reversed or the reproduction output is increased by using a magnetic underlayer having a high magnetization. An underlayer formed of a nonmagnetic material is provided in an attempt to control the crystal structure of the magnetic portion or the nonmagnetic portion or to prevent mixing of impurities from the substrate. For example, in the case of using an underlayer having lattice spacing close to that of the magnetic portion having a desired crystal orientation, it is possible to control the crystal state of the magnetic portion. Also, there is a case where the crystal or amorphous properties of the magnetic portion or the nonmagnetic portion is controlled by using an amorphous underlayer having a desired surface energy. For preventing the mixing of impurities from the substrate, a thin film having small lattice spacing or a high density is used as the underlayer. It is possible for the magnetic or nonmagnetic underlayer described above to have the both functions described above. To be more specific, it is possible for the magnetic underlayer to control the crystal properties of the magnetic portion. In this case, the effect on the recording-reproducing characteristics and the effect on the crystal properties are combined to produce a synergetic effect so as to make the particular magnetic underlayer more desirable. Incidentally, it is possible for the underlayer to be a surface modified layer of the substrate formed by, for example, ion plating, doping under an atmosphere gas, or neutron radiation. The particular technique permits omitting an additional deposition process and, thus, is desirable in manufacturing the medium.

It is possible to employ a heater as a means for heating the magnetic recording medium any of the system for uniformly heating the entire medium and the system for locally heating a part of the medium. In general, if a high-density magnetic recording medium is heated, the medium is affected by thermal fluctuation so as to deteriorate the ability of retaining the recorded information. Therefore, it is desirable to locally heat a part of the medium, with the major portion of the medium held at room temperature or at temperatures lower than room temperature. It should be noted, however, that, in some media, the ability of retaining the recorded information are not deteriorated even if the entire region is heated When it comes to a system using such a medium, it is desirable to heat the entire medium because the manufacturing cost can be lowered.

The heater is not particularly limited. For performing the heating rapidly and locally, used is, for example, a laser used in an optical disk, an induction heating apparatus or a probe like a heating wire supported such that its spacing from the medium can be controlled. For performing the local heating more finely, used is, for example, a system that a laser beam is converged on the medium surface by using an optical system such as a lens, a system that a fine antenna is formed on the tip of a probe and an induction heating is applied through the antenna, a system that the shape of that portion of a heating probe which faces the medium is made as sharp as possible, or a system that an electron beam is emitted from a sharpened tip of a probe. It is possible to arrange such a heater on the side of the recording surface of the medium Or on the opposite surface oil the side of the substrate.

For applying a magnetic field to the magnetic material, it is possible to use a magnetic head having a magnetic circuit comprising an induction coil and a magnetic pole on the edge surface of a slider as used in the ordinary HDD. It is also possible to arrange a permanent magnet. It is also possible to further add a magnetic layer to the medium so as to generate a stray field from the magnetization distribution by temperature distribution or by light irradiation. Further, it is possible to utilize the leakage magnetic field generated from the magnetic recording layer itself. In the case of arranging a permanent magnet, the magnetic field can be applied rapidly with a high density by, for example, changing the distance between the permanent magnet and the medium variable or by miniaturizing the permanent magnet.

The principle of the present invention will now be described.

Where the magnetic recording layer is formed of a large number of magnetically isolated magnetic particles, the magnetization reversal process is a thermally activated phenomenon and it is generally known to be represented by the formulas given below:

$$N(t) = N_0 \cdot \exp(-r \cdot t) \quad (1)$$

$$r = A \cdot \exp(-\Delta E/(k_B \cdot T)) \quad (2)$$

$$\Delta E = K_u \cdot V((2 \cdot K_u - H \cdot Ms)/2 \cdot K_u)^2 \quad (3),$$

where N(t) is a number of magnetic particles reversed with the elapsed time t, $N_0$ is a number of initial magnetic particles, A is a frequency factor, $\Delta E$ is an activation energy, $k_B$ is Boltzmann's constant, T is an absolute temperature, $k_u$ is a magnetic anisotropy energy density, V is a volume of the magnetic particle, H is the total magnetic field applied to the magnetic particles, and Ms is the saturation magnetization of the magnetic particles.

For evaluating the retention time of the recorded magnetization of the magnetic recording medium at room temperature, it suffices to consider the retention of the spins that has been already reversed Therefore, the condition of H=0 is assumed for the sake of simplicity. The ratio $N(t)/N_0$ of the magnetic particles that have been subjected to the magnetic reversal at the elapsed time t is represented as follows:

$$N(t)/N_0 = \exp(-A \cdot \exp(-K_u V/(k_B \cdot T)) \cdot t) \quad (4)$$

"A" is known to be $10^9 (s^{-1})$. The condition $K_u V \gg k_B T$ implies that the magnetic reversal scarcely takes place unless a very long time t has elapsed. However, under the condition $K_u V \sim k_B T$, the magnetic reversal comes to take place over the time on the order of seconds to years. This is the phenomenon called the thermal fluctuation.

For example, IEEE Trans. Magn., Vol. 35, p. 4423(1999) discloses that the value of $K_u V/k_B T$ is required to be about 60 for ten-years storage times and for 40 Gbits/in$^2$ conditions. From the viewpoint of life cycle of a hard disk drive, however, it is considered that attenuation in signals derived from the reduction of magnetization while the medium is held at room temperature for five years is negligibly small and gives rise to no practical problem. In addition, although the recorded magnetization is degraded rapidly immediately after recording, it is gradually degraded after the initial stage of degradation, which means that the degradation does not make much difference in signal intensity even in five years or in ten years. The period during which the recorded magnetization can be retained stable is called "the stable retention time $t_{st}$", and the desired value of $t_{st}$ is set at least five years in the present specification. On the other hand, IEEE Trans. Magn., Vol. 33, p, 978(1997) discloses that the SN ratio drops by about 6 dB over 6 months for $K_u V/k_B T \sim 60$ but is unchanged for $K_u V/k_B T \sim 80$. Taking into consideration the values in these references, five-years retention of the recorded magnetization for 60 or more of $K_u V/k_B T$ is set to a target herein.

FIG. 1 shows the change with time in the temperature of the magnetic recording medium in the thermally-assisted magnetic recording time. In this case, the condition of $K_u V \sim k_B T$ is established when the temperature is elevated so as to markedly accelerate the thermal fluctuation. However, it the high temperature time as short, the total magnetic reversal amount is small and thus the signal degradation is small. It follows that, in designing a thermally-assisted magnetic recording apparatus, very important are the magnetic characteristics and the hear property of the medium and the heating method, which permit the thermal fluctuation amount in the period of elevated medium temperature to fall within a range allowable in the system. However, a tremendous work is necessary if the apparatus is designed through the large number of read/write tests of many trial manufactures of the apparatus. Under the circumstances, required is a method of easily obtaining the design criterion of the apparatus.

Since formula (4) given above is not a simple linear combination, it is difficult to derive an analytical formula applicable to arbitrary temperature response T(t) and $K_u(T)$. Even if the analytical formula is derived, it becomes complex expression and is not practical for the use of an apparatus design. Such being the situation, considered was a method that the change with time in the temperature of the magnetic recording medium was discretized by a certain period of time $\Delta t$ and formula (4) was applied on the assumption that the temperature of the magnetic recording medium would be constant within said period of time $\Delta t$ so as to estimate the reversal amount within the period of time $\Delta t$, followed by summing the reversal amount for the total time span so as to estimate the total reversal amount.

It has been found, however, that the magnetic reversal amount within the very short period of time $\Delta t$ is very small, making a simple summation very difficult. For example, if the stable retention time $t_{st}$ of five years and the $K_u V/k_B T$ of 80, which are the values used for determining the acceptance or rejection of the reversal amount, are substituted in formula (4), simply obtained is $N(t)/N_0 = \exp(2 \cdot 10^{-18})$, which is very close to 1. If the values are calculated with each very short period of time and summed, it is necessary to secure a very large effective digit numbers and to use the method of the accuracy assurance calculation. Naturally, such a method is not practical.

Also studied was a method that a natural logarithm in of a very small reversal amount of $N(t)/N_0$ was taken to convert the value to the order that would be handled easily. Specifically, defined was:

$$F \equiv -\ln(N(t)/N_0) = A \cdot \exp(-K_u \cdot /(k_B T)) \cdot t.$$

In this case, the value of the stabilized condition is: $F = 2 \cdot 10^{-18}$. The value on this order can be barely handled even for a very short period time. If the value of F for a certain period of time thus obtained is set: $\Delta F_i = \ln(\Delta D_i)$ ($\Delta D_i$ being the reversal amount $N(\Delta t_i)/N_0$ for an i-th period of time), the total reversal amount is: $\Delta D_1 + \Delta D_2 + \Delta D_3 \ldots$, and the $F_{total}$ is: $F_{total} = \ln(\Delta D_1 + \Delta D_2 + \Delta D_3 + \ldots)$. However, if $F_{total}$ is calculated from $\Delta F_i$, i.e., the value converted into the order that can be handled, a complex calculation, not a simple summation, is required so as to give rise to the problem in terms of the effective digit and the accuracy as pointed out previously.

Under the circumstances, the present inventors have conducted further researches so as to find a method using a new concept of an equivalent degradation time $t_{EQ}$ as described below. The equivalent degradation time is a physical amount in which the degree of degradation of the recorded magnetization within a certain period of time when the magnetic recording medium is held at a constant temperature within a certain period of time is represented by the retention time of the magnetic recording medium at room temperature for bringing about the same amount of the degradation of the recorded magnetization. In this method, the degradation amount of the recorded magnetization is not directly calculated and, thus, it is impossible to know directly the degradation amount, However, the equivalent degradation time noted above represents the quantity that can be handled without performing the accuracy assurance calculation with the effective digit numbers of an ordinary computer. In addition, it is possible to estimate the total equivalent degradation time by simply summing the equivalent degradation time for each period of time. It follows that it is possible to design the magnetic recording apparatus by a simple method.

For simplicity, a heat stability parameter is set as: $K_u V/k_B T = \beta(T)$, and the value of $\beta$ at room temperature providing the basis for calculation of the equivalent degradation time $t_{EQ}$ is set as $\beta_{st}$. In this case, formula (4) for a certain period of time $\Delta t$ can be expressed as follows:

$$N(\Delta t)/N_0 = \exp(-A \cdot \exp(-\beta) \cdot \Delta t)$$
$$= \exp(-A \cdot \exp(-\beta_{st}) \cdot \Delta t_{EQ}),$$

where $\beta$ is the thermal-fluctuation stability coefficient in the period of time $\Delta t$ in respect to a temperature T of the magnetic recording medium.

The formula given above gives the formula given below:

$$\Delta t_{EQ} = \Delta t \cdot \exp(\beta_{st})/\exp(-\beta)$$
$$= \exp(\ln(\Delta t) - \beta + \beta_{st}).$$

The quantity of $(\ln(\Delta t) - \beta + \beta_{st})$ given above is a quantity of the order that can be handled without taking the large effective digit numbers and the accuracy assurance calculation into account. It should be noted that, if the values of $\Delta t_{EQ}$ thus obtained is simply summed for the required period of time, it is possible to know easily the equivalent degradation time $t_{EQ}$ corresponding to the total degradation amount of the recorded magnetization.

In this method, how to set the period of time $\Delta t$ is the issue to be considered. For example, if only one period of time is taken in all the process of the temperature rise to the highest temperature and the cooling of the magnetic recording medium, the equivalent degradation time $t_{EQ}$ is clearly under evaluated. In general, it is reasonable, if the time span during which a medium is held at a temperature not lower than room temperature plus 1/10 of the difference between room temperature and the highest temperature in the temperature profile of the heated magnetic recording medium is discretized into at least 10 sections. Also, where comparison is made under various recording conditions and medium conditions, it is desirable to set the period of time $\Delta t$ at 10 ns or shorter because the comparison can be made relatively easily. It is desirable to employ the smaller one of the two $\Delta t$ values noted above as $\Delta t$ because it is possible to avoid an under evaluation. However, since the value of the inverse of the constant A used in the basic formula is on the order of ns, it is undesirable to set the period of time $\Delta t$ at a value shorter than 1 ns because in this case the advantage of the method according to an aspect of the present invention is rendered small. Under the circumstances, it is desirable to obtain the value $t_i$ equal to 1/10 of the time span during which the magnetic recording medium is held at a temperature not lower than $(T_R + (T_{max} - T_R)/10)$, where $T_{max}$ denotes the highest temperature attained by the heated magnetic recording medium at a certain position and $T_R$ denotes room temperature, and $\Delta t$ is set at $t_i$ where $t_i$ is 1 to 10 ns, $\Delta t$ is set at 10 ns where $t_i$ exceeds 10 ns, and $\Delta t$ is set at 1 ns where $t_i$ is shorter than 1 ns.

The judgment as to whether the recorded magnetization of the magnetic recording medium is stable or not differs depending on the requirement for the system and can be represented in general by an index of the stable retention time $t_{st}$ for the magnetic recording medium having a certain $\beta_{st}$. The values of $\beta_{st}$ and $t_{st}$ variously differ depending on the system used. Assumed in the present invention is a magnetic recording apparatus having $\beta_{st}$ of about 80 and $t_{st}$ of at least five years. In the present invention, it is possible to achieve the performance required for the thermally-assisted HDD system if the stable retention time $t_{st}$ and the total equivalent degradation time $t_{EQ}$ ($= \Sigma \Delta t_{EQ}$) meets the relationship: $t_{EQ} < t_{st}$. In the present invention, the medium, the recording system and the entire system are designed to meet the relationship noted above. Incidentally, even if the recorded magnetization is degraded by about 10%, the recorded magnetization is assumed to be within an acceptable range. Therefore, it suffices to meet the relationship of $t_{st}/10 < t_{EQ}$.

The specific parameters affecting the design of the magnetic recording medium meeting the relationship $t_{EQ} < t_{st}$ include, for example, the control parameters in terms of the apparatus such as the change with time in the temperature T(t) of the magnetic recording medium, the heat quantity given by a heater, the recording frequency, the rotating speed of the disk, and the distance between the heater and the magnetic head, and control parameters in terms of the medium such as $K_u(T)$ of the magnetic recording layer.

In order to control the change with time in the temperature T(t) of the magnetic recording medium, it is possible to employ the methods employed in the ordinary optical recording medium. For example, it is possible to change the value of dT/dt so as to be increased by stacking a heat sink layer having high heat conductivity on a magnetic recording medium. By contraries, it is possible to change the value of dT/dt so as to be decreased by stacking a dielectric layer having heat-insulating properties on the magnetic recording layer. Also, in the case of employing a laser heating, at is possible to decrease the value of dT/dt by forming a plurality of layers causing a light absorption by designing the absorbance and the film thickness. Further, in the case of employing a laser heating, it is possible to adjust the value of T(t) of the medium my controlling the irradiation power, the beam diameter and the irradiating pattern (continuous or pulse form). Also, it is possible for the moving velocity of the medium relative to the laser beam to be used as an adjustment parameter in the case of the system in which the moving velocity cannot be changed arbitrarily as in the conventional HDD apparatus, it is possible to adjust T(t) by changing the irradiation power or the pulse interval relative to the moving velocity. The similar technology can also be employed in the case of the induction heating. It is also possible to change the heating method with the time.

Basically, it is possible to control $K_u(T)$ of the magnetic recording layer by selecting the material system. It is also possible to control $K_u(T)$ by adding a magnetic or nonmagnetic material to the magnetic recording medium or by changing the fine structure of the magnetic recording layer. Also, in the case of using a ferrimagnetic material having a Curie point higher than the highest attainable temperature, it is possible to realize a magnetic recording layer having a small change of $K_u$ relative to the change in temperature. Further, it is possible to realize more complex temperature dependency of the magnetic characteristics through the exchange coupling or the magnetostatic coupling by stacking a plurality of magnetic recording layers (formed of, for example, ferrimagnetic, the ferromagnetic or antiferromagnetic material) differing from each other in the temperature dependency of some magnetic characteristics.

In the discussion given above, leakage magnetic field acting among the magnetic particles is neglected. It should be noted in this connection that the leakage magnetic field is a quantity sensitive to the fine structure and, thus, is a physical quantity that is difficult to evaluate unless a first principles simulation such as an LLG simulator is used. It is necessary to employ such a simulation in the stage of optimizing the design in detail. However, the present invention is directed to the design method of a magnetic recording apparatus for obtaining a simple design criterion before the optimizing stage of the design.

In the magnetic recording apparatus and the design method of the magnetic recording apparatus according to the present invention, it suffices to perform the summation of $\Delta t_{EQ}$ values for the time after formation of the magnetization transition on an arbitrary recording track of the magnetic recording medium. This will now be described in detail. During the recording operation, recording is performed by using a magnetic head to a locally heated portion and, thus, in the process of performing recording, it is possible for the magnetic recording medium to be under the state that the thermal fluctuation is accelerated or to be under the paramagnetic state. However, after the magnetic head has passed a point to be recorded or a point on the medium on which a magnetization transition is to be formed, it is necessary to diminish promptly the thermal fluctuation so as to fix the direction of the magnetization. The point on which this condition is severest is the point on which the magnetization transition is formed on the recording track. The magnetization transition is formed by a rapid reversal of the direction of the magnetic field supplied from the head. To be more specific, in the magnetization transition position, a change that the direction of the magnetic field supplied is rapidly reversed after the head is slightly moved. If the thermal fluctuation of the magnetization transition position remains to be under the accelerated state in this case, the magnetization transition position is strongly affected by the reversal of the head magnetic field, resulting in failure to form a steep magnetization transition. It follows that it is necessary to suppress acceleration of the thermal fluctuation to a low level immediately after formation of the magnetization transition. In order to meet this requirement, it is necessary for $t_{EQ}$ obtained by summing $\Delta t_{EQ}$ values to meet the relationship of $t_{EQ} < t_{st}$ for the time after formation of the magnetization transition on an arbitrary recording track of the magnetic recording medium.

EXAMPLES

Example 1

Figure 2:
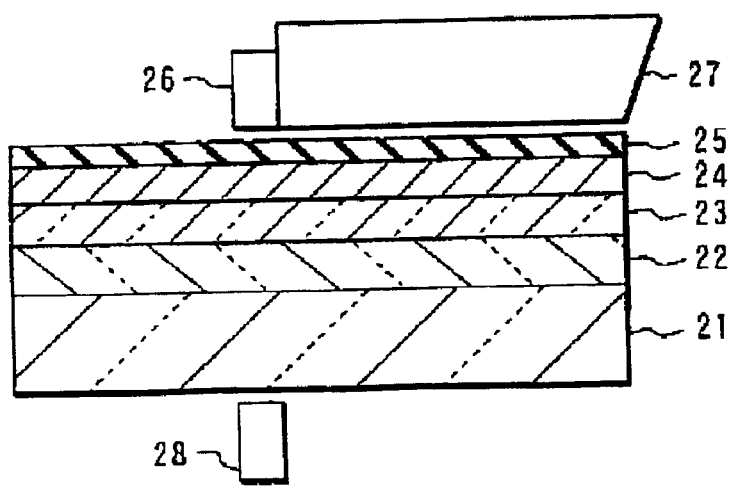
FIG. 2 is a cross sectional view schematically showing an arrangement of a magnetic recording medium, a magnetic head and a laser in the magnetic recording apparatus according to one embodiment of the present invention.

Fabricated was a magnetic recording apparatus constructed as shown in FIG. 2. The magnetic recording medium comprises a 2.5-inch glass substrate 21 and a stacked structure formed on the glass substrate 21, the stacked structure including the $SiO_2$ first underlayer 22 having a thickness of about 100 nm, a ZnO second underlayer 23 having a thickness of about 140 nm, a CoCrPt magnetic recording layer 24 having a thickness of about 20 nm, and a carbon protective layer 25 having a thickness of about 10 nm. The slider 27 having a magnetic head equipped with the recording-reproducing element 26 mounted to the tip, which is similar to that used in the ordinary HDD apparatus, is arranged in the magnetic recording apparatus of the construction described above. When the magnetic recording medium is rotated, the slider 27 and the recording-reproducing element 26 are made in a floating state on the magnetic recording medium. In this magnetic recording apparatus, a flying height of 30 nm is obtained when the magnetic recording medium is rotated at 4,500 rpm. The laser 28 is arranged below the magnetic recording medium in a manner to correspond to the position of the recording-reproducing element 26. The magnetic recording layer 24 positioned right under the recording-reproducing element 26 is irradiated from the side of the glass substrate 21 of the medium with a laser beam having a wavelength of 641 nm, which is converged to have a diameter of 900 nm.

The magnetic recording layer was found to have Ku of $8 \times 10^6$ erg/cc, coercive force Hc of 4 kOe, and a value of $\beta(T) = K_u V/k_B T$ at room temperature (25° C.) (room-temperature stability coefficient $\beta_{st}$) of 80. The temperature dependency of the coercive force of the magnetic recording layer was measured. It was found that the coercive force was decreased substantially linearly relative to the temperature, and the temperature at which the coercive force Hc became substantially zero (Curie point Tc) was found to be 600K (327° C.).

Figure 3:
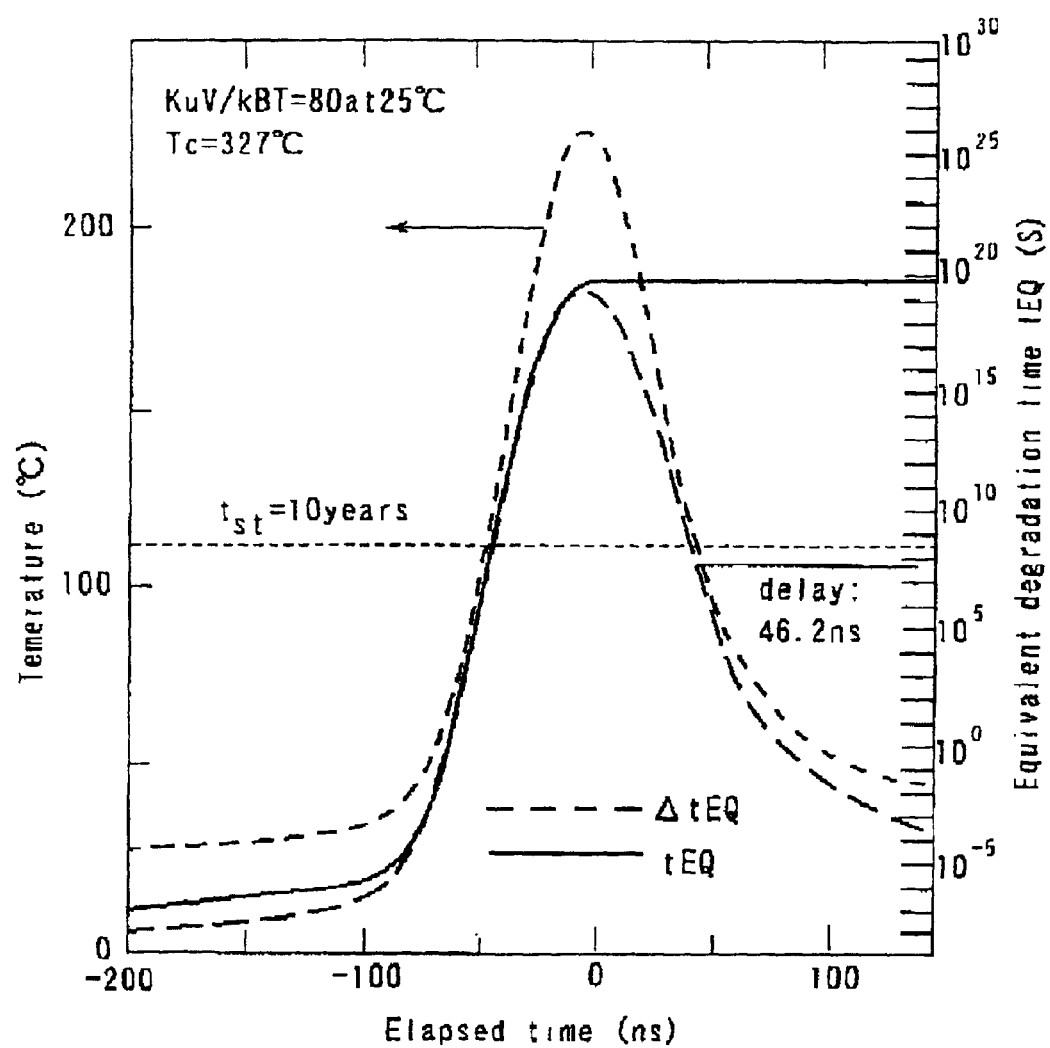
FIG. 3 is a graph showing the changes with time in the temperature of the magnetic recording medium, $\Delta t_{EQ}$ and $t_{EQ}$ in respect of the magnetic recording apparatus for Example 1 of the present invention.

The magnetic recording medium was rotated at a linear velocity of 5 m/s, and the change in temperature when the magnetic recording medium was irradiated with a laser beam having a power of 5 mW was calculated by using a heat diffusion simulator, with the results as shown in FIG. 3, The dotted line in FIG. 3 denotes the change in temperature of the magnetic recording medium. Also, the elapsed time is denoted with the time when the magnetic recording medium attained the highest temperature set at zero. As apparent from FIG. 3, the temperature of the magnetic recording medium is elevated in about 50 ns, and the magnetic recording medium is cooled in about 100 ns from the time when the highest temperature is attained.

The magnetic recording medium was heated under the conditions given above, and values of $\Delta t_{EQ}$ were calculated at a period of time $\Delta t$ of 4.2 ns and further their summation ($t_{EQ}$) was calculated. In FIG. 3, the broken line denotes the change of $\Delta t_{EQ}$ and the solid line denotes the change of the summed $t_{EQ}$. FIG. 3 also shows the level of the stable retention time $t_{st}$ of ten years required for the system.

As apparent from FIG. 3, if the laser beam is scanned on the recording domains with the power noted above, the thermal fluctuation is accelerated on the recording domains so as to bring about demagnetization. On the other hand, if the recording magnetic field is supplied from the head in at least 46.2 as after the magnetic recording medium has attained the highest temperature, the equivalent degradation time $t_{EQ}$ thereafter is rendered shorter than $t_{st}$ of ten years, with the result that the fatal demagnetization in the system is not brought about, as shown in FIG. 3. This implies that, if a recording gap of the head is formed rearward (on the side of the trailing edge) of the position where the heated magnetic recording medium attains the highest temperature so as to form the magnetization transition, it is possible to perform recording without bringing about a thermal demagnetization. It follows that it is possible to obtain easily the design criterion on the optimum position of the recording gap relative to the laser beam irradiating position, In order to confirm the result of the calculation described above, a recording experiment was conducted with a single frequency under the operating conditions described above. First, recording was performed successively while deviating the position of the laser spot irradiated from the medium substrate surface at an interval of 50 nm, which corresponds to 10 ns, so as to examine the relationship between the relative distance between the laser spot and the recording gap and the reproduced signal intensity. Where the laser spot was apart from the recording gap position by 250 nm, which corresponds to 50 ns, on the trailing side, it was possible to obtain signal intensity not lower than 30 dB in terms of CNR. However, where the relative distance was no larger than 200 nm, which corresponds to 40 ns, the signal intensity was lowered rapidly. Incidentally, where the laser spot was apart from the recording gap position by more than 250 nm, the signal intensity was lowered with increase in the distance. It is considered reasonable to understand that it was impossible to perform sufficient recording because the temperature rise of the magnetic recording medium was small.

Then, recording was performed by setting the position of the laser spot at 250 nm, which corresponds to 50 ns, from the recording gap on the side of the trailing edge, so as to form reversed domains with a single frequency, followed by irradiating a full circle of a track of the disk with a laser beam with the power equal to that described above without applying a recording magnetic field. When the signal intensity was measured with the reproducing head, the signal intensity was found to be as low as substantially a noise level.

Example 2

Fabricated was a magnetic recording apparatus equal to that prepared in Example 1, except that used was a magnetic recording layer differing in composition from that used in Example 1 and that the temperature of at which the coercive force Hc becomes substantially zero (Curie point Tc) was 500K (227° C.). For the magnetic recording layer, the value of $\beta_{st}$ of was 150. Also, the stable retention time $t_{st}$ required for the system was five years.

A recording experiment was conducted as in Example 1 in respect of the magnetic recording apparatus thus prepared. An analysis was performed as in FIG. 3, with the result that the magnetic field application time (delay) required for the recording was 54.6 ns. In fact, a high CNR was obtained when the distance between the recording gap and the laser spot was set at 300 nm, which corresponds to 60 ns, or more.

Another experiments were conducted, in which signals recorded with a single frequency by setting appropriately the distance between the recording gap and the laser spot were irradiated with a laser beam without applying a recording magnetic field as in Example 1. In this experiment, however, examined was the relationship between the intensity of the reproduced signal intensity after the laser beam irradiation and the irradiation power by changing the irradiation power.

Figure 4:
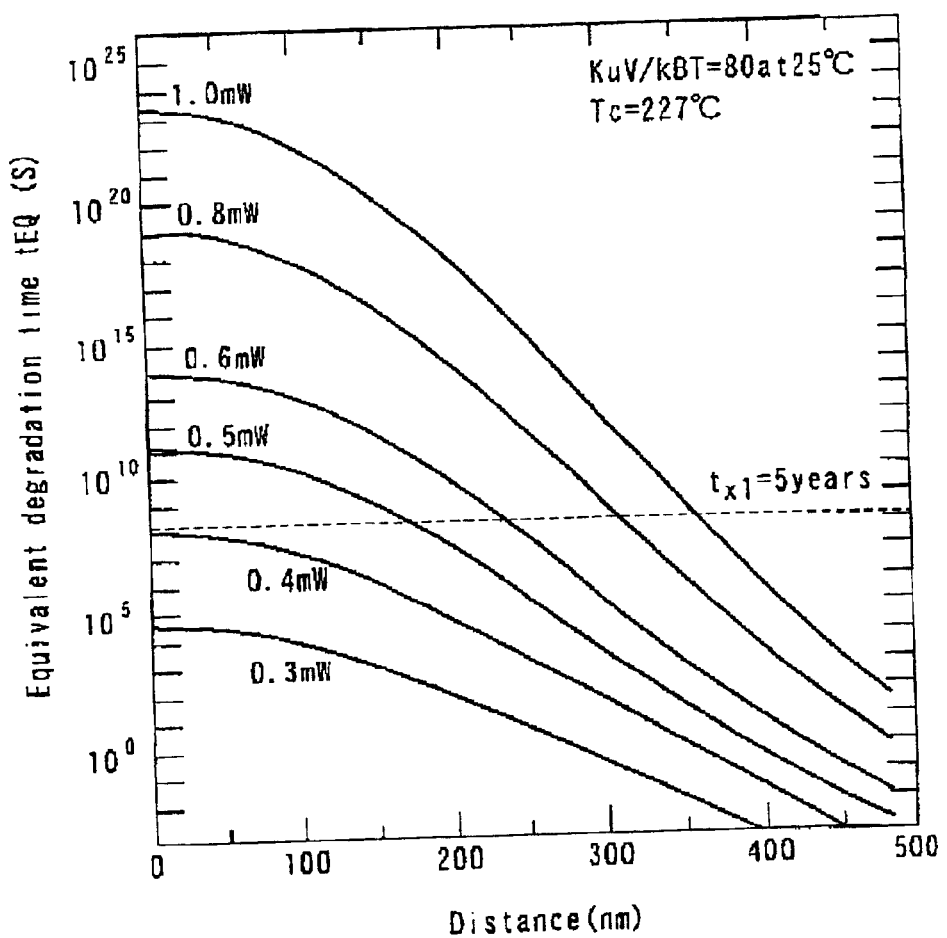
FIG. 4 is a graph showing the relationship between the distance from the recording track and $t_{EQ}$ with the irradiation power of a laser beam used as a parameter in respect of the magnetic recording apparatus for Example 2 of the present invention.

Prior to the experiments, $t_{EQ}$ was estimated by the method of the present invention, with the results as shown in FIG. 4. It is seen from FIG. 4 that the irradiation condition satisfying the stable retention time $t_{st}$ of the system of five years is not higher than 0.4 mW. The stable condition of the magnetic recording apparatus of this Example is defined that the reduction of CNR five years later is 1.5 dB.

According to the experiments, the relationship between the irradiation power and the reduction of CNR is 2.5 dB with 0.5 mW, 1.8 dB with 0.4 mW and 1 dB with 0.3 mW, supporting that the design according to the present invention is reasonable.

Where a magnetic recording apparatus is actually designed and manufactured on the trial basis, it is very difficult in view of the measurement error to determine the specification from the slight reduction of the obtained CNR. However, the design criterion can be obtained easily in the case of using the method of the present invention as described in this Example.

Example 3

Fabricated was a magnetic recording apparatus as in Example 1, except that the $SiO_2$ underlayer was omitted to allow the underlayer to be formed of a ZnO layer alone having a thickness of about 100 nm and that the magnetic recording layer was formed of a CoPt—O layer having a thickness of about 20 nm. For the magnetic recording layer, the temperature at which the coercive force Hc becomes substantially zero (Curie point Tc) was 1420K, and the value of $\beta_{st}$ was 150. Also, the stable retention time $t_{st}$ required for the system was five years.

Experiments were conducted in respect of the magnetic recording apparatus, in which the magnetic recording medium was irradiated with a laser beam after the thermally-assisted magnetic recording as in Example 2. In Example 3, however, in order to examine the resistance to cross erase, the irradiating portion with the laser beam was displaced from the initial recording track at an interval of 10 nm and brought back again to the portion of the initial recording track for performing the reproduction so as to examine the degradation of the signal intensity. Since the magnetic recording layer used in this Example had a relative high $\beta_{st}$, a high resistance to the cross erase was expected.

Figure 5:
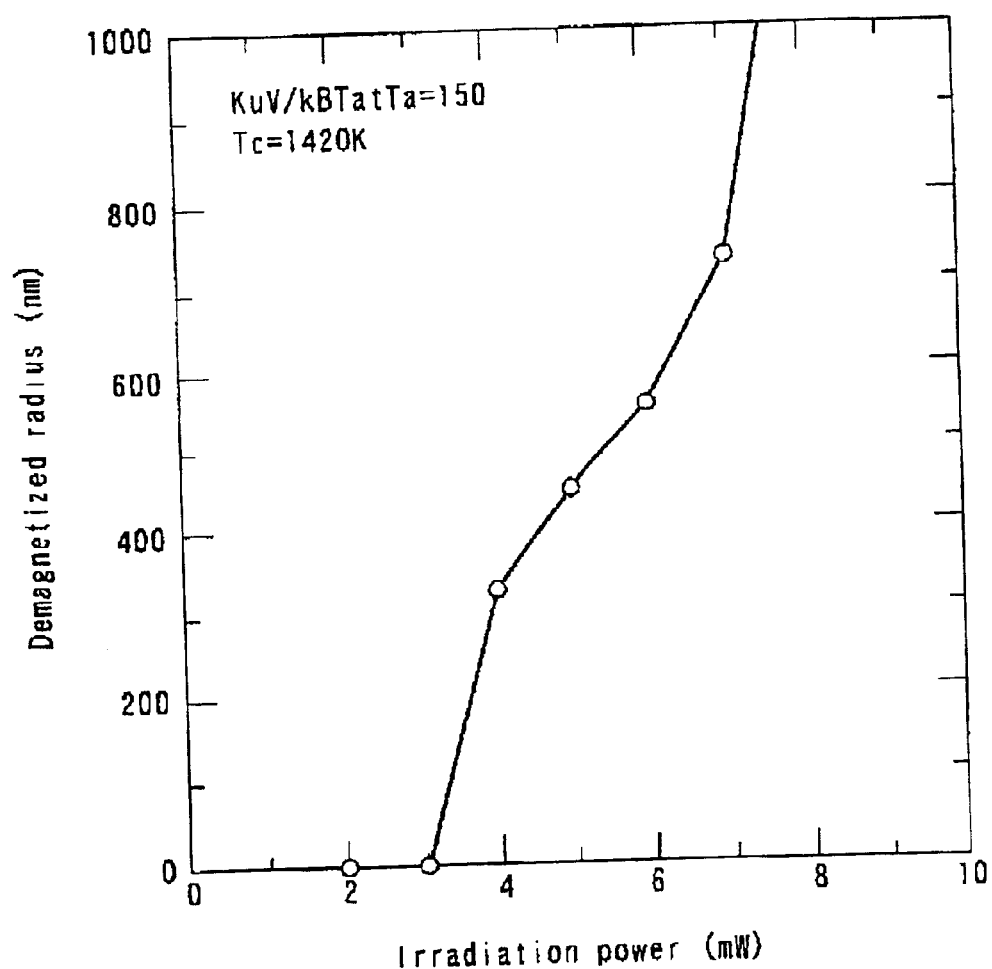
FIG. 5 is a graph showing the relationship between the irradiation power of a laser beam and the demagnetized radius in respect of the magnetic recording medium for Example 3 of the present invention.

The thermal fluctuation acceleration (cross erase) of the adjacent track was estimated by the method of the present invention in respect of the magnetic recording apparatus for Example 3, with the results as shown in FIG. 5. In the graph of FIG. 5, the laser irradiation power (mW) is plotted on the abscissa. On the other hand, a region in which the thermal fluctuation is accelerated to cause demagnetization and to generate the signal reduction defined in the system so as not to satisfy the stable condition is plotted on the ordinate of the graph. In the graph of FIG. 5, the size of the demagnetized region is denoted as a demagnetized radius (nm) from the center of a track for comparison with the irradiated laser spot.

As apparent from FIG. 5, the demagnetized radius is zero where the irradiation power is not larger than 3 mW. Therefore, demagnetization does not take place even in reversed domains right on the track irradiated with a Laser beam as in FIG. 4. However, if the irradiation power is increased to reach 4 mW, demagnetization takes place in a region within about 300 nm from the center of the track.

In the actual thermally-assisted magnetic recording system, the operation to apply a laser beam irradiation alone without applying a recording magnetic field to the reversed domains is not performed. However, the problem to be noted is that, while the recording operation is being performed, the magnetization of the adjacent track is damaged by the heat generated by the recording operation, The experimental data given in FIG. 5 clearly give a design criterion that, when recording is performed at a laser power of 4 mW, it is necessary to set the distance between the adjacent tracks (specifically, the distance to the outer edge portion of the reversed domains on the adjacent track) at 300 nm or more.

The particular design criterion can be easily calculated by simply changing the parameter relative to a specific request, for example, for the design as to how much margin of the laser power should be ensured In the case of using a medium differing in the magnetic characteristics. It takes much time and is inefficient to carry out these design operations by experiments alone. However, the design operations can be performed easily by employing the method of the present invention.

Example 4

Studied in this Example was the thermal fluctuation in the case of irradiating a perpendicular magnetic recording medium with a short pulse beam. Prepared was a perpendicular magnetic recording medium comprising a glass substrate, a soft magnetic underlayer having a thickness of about 300 nm, a CoCrPt magnetic recording layer having a thickness of about 15 nm and a carbon protective layer having a thickness of about 2 nm. For the magnetic recording layer, the value of $\beta_{st}$ was 80, and the temperature at which the coercive force Hc becomes substantially zero (Curie point Tc) was 500K (227° C.).

It is difficult to know directly the heat conductivity of each of the layers forming the medium. In this Example, the heat conductivity was estimated as follows. Specifically, a sample is disposed on a heat sink and the temperature of the sample is changed within a range between the liquid nitrogen temperature and several hundred degrees centigrade. At each temperature, the sample is irradiated with a laser beam having a diameter of about 100 $\mu$m with a power low enough not to heat the sample so as to examine the temperature dependency of the reflectance. Then, the laser beam is converged to several $\mu$m to 1 $\mu$m so as to generate a local static temperature distribution and to measure the reflectance in this case. The result is reproduced in a simulation, and the heat conductivity of each layer or the equivalent heat conductivity when the layer is regarded as being a single layer is obtained by the fitting. The accuracy of the fitting can be improved by performing the measurement-simulation operation under a different ambient temperature within the heat sink. It has been clarified by the measurement that the heat conductivity of each layer was about 10% of the balk value. Since it is known to the art that the heat conductivity of a thin film is lowered to scores of percent or less of the bulk value, an appreciable error is not generated even if the $t_{EQ}$ evaluation is carried out by the fitting with the value around the heat conductivity of the thin film used as the starting value or by a method of the present invention on the assumption that the heat conductivity of the thin film is assumed as 10% of the bulk value.

Figure 6:
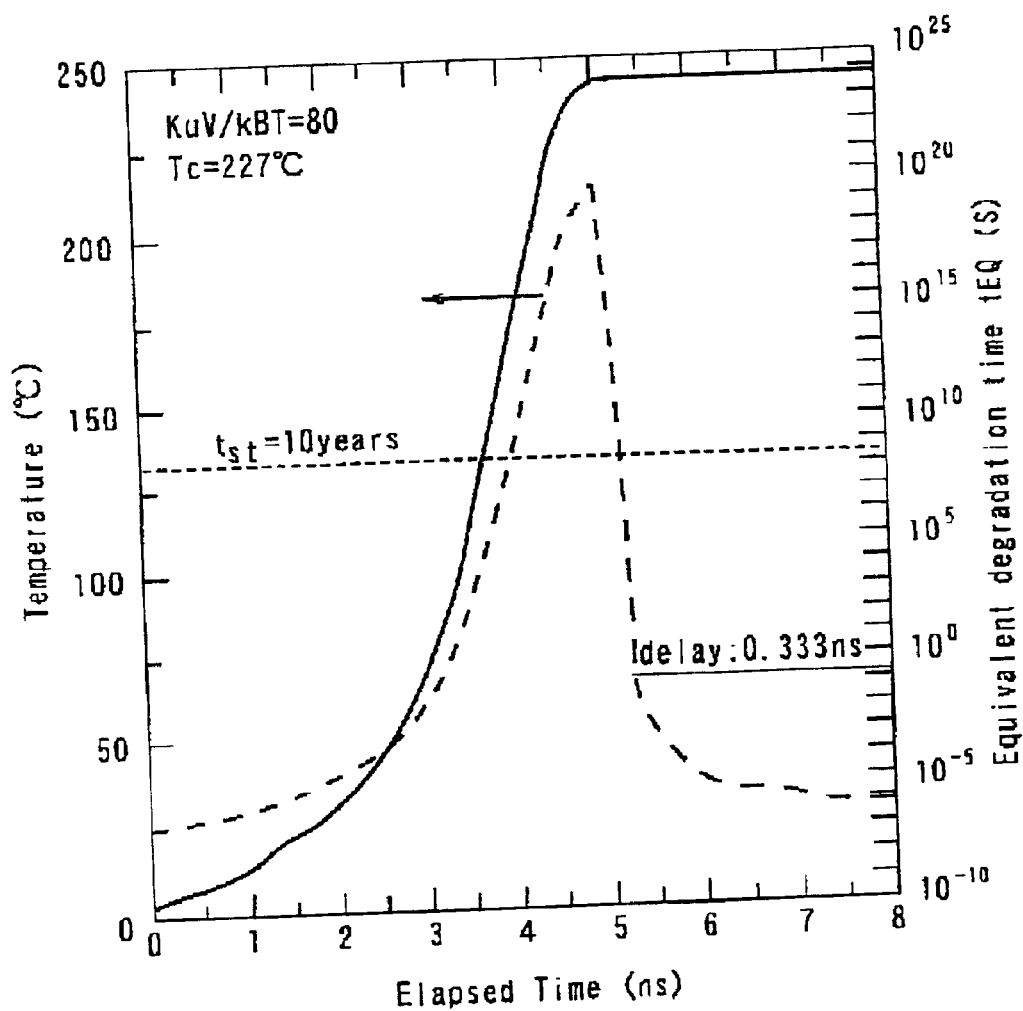
FIG. 6 is a graph showing the changes with time in the temperature of the magnetic recording medium and $t_{EQ}$ in respect of the magnetic recording apparatus for Example 4 of the present invention.

The temperature response in the case of irradiating the medium with a laser pulse of 50 nm in FWHM, 0.51 mW and 5 ns and rotating the medium at a linear velocity of 30 m/s was calculated by using the constant obtained as above. Based on the temperature response thus calculated, $t_{EQ}$ was evaluated by the method of the present invention, with the results as shown in FIG. 6. In FIG. 6, the change in temperature of the magnetic recording medium is denoted by a dotted line. If the stable retention time $t_{st}$ required for the system is supposed to be ten years, signal degradation is brought about in the case of performing the laser irradiation alone. It should be noted, however, that, if a recording magnetic field is supplied from the head within at least 0.333 ns from the time when the magnetic recording medium has attained the highest temperature, the signal degradation does not take place thereafter. This clearly suggests that it is possible to form a magnetization transition by temperature distribution, if the recording gap position and the laser spot position are adjusted at substantially the same position.

As described above, the method of the present invention permits easily achieving an appropriate system design in respect to a given medium.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording apparatus, comprising:

a magnetic recording medium having a magnetic recording layer, the medium being required to have a stable retention time tat for recorded magnetization at room temperature and having a thermal-fluctuation stability coefficient $\beta_{st}$ at room temperature calculated from a thermal-fluctuation stability coefficient β(T) at an absolute temperature T, expressed by the following equation:

$$\beta(T)=K_u V/k_B T,$$

where $K_u$ is a magnetic anisotropy energy density, V is an activation volume, and $k_B$ is Boltzmann's constant, and the medium showing an equivalent degradation time $t_{EQ}$ calculated from the following equation:

$$t_{EQ}=\Sigma(\Delta t_{EQ}),$$

that sums values of $\Delta t_{EQ}$ within a given period of time $\Delta t$ for a time span during which the medium is kept at a temperature at which the recorded magnetization is substantially degraded, where $\Delta t_{EQ}$ is defined by the following equation:

$$\Delta t_{EQ}=\exp(\ln(\Delta t)-\beta+\beta_{st}),$$

where β is a thermal-fluctuation stability coefficient for a medium temperature T in the period of time $\Delta t$, wherein the relationship of $t_{EQ} < t_{st}$ is met between the stable retention time $t_{st}$ for recorded magnetization at room temperature and the equivalent degradation time $t_{EQ}$;

a heater configured to heat the medium; and a magnetic head configured to apply a magnetic field to the medium.

2. The apparatus according to claim 1, wherein the temperature at which the recorded magnetization is substantially degraded is defined to be a temperature not lower than room temperature plus 1/10 of the difference between room temperature and the highest temperature of a heated magnetic recording medium.

3. The apparatus according to claim 1, wherein the period of time $\Delta t$ is set to $t_i$ when $t_i$ falls within a range of between 1 ns and 10 ns, set to 10 ns when $t_i$ exceeds 10 ns, and set to 1 ns when $t_i$ is shorter than 1 ns, where $t_i$ is obtained by equally dividing by 10 the time span during which the medium is held at a temperature not lower than room temperature plus 1/10 of the difference between room temperature and the highest temperature of a heated magnetic recording medium.

4. The apparatus according to claim 1, wherein the values of $\Delta t_{EQ}$ are summed for a time span after the formation of a magnetization transition on the medium.

5. The apparatus according to claim 1, wherein the stable retention time $t_{st}$ for the recorded magnetization at room temperature is at least 5 years.

6. The apparatus according to claim 1, wherein the thermal-fluctuation stability coefficient $\beta_{st}$ is 60 or more.

7. The apparatus according to claim 1, wherein the equivalent degradation time $t_{EQ}$ meets the relationship of $t_{st}/10 < t_{EQ}$.

8. A method of designing a magnetic recording apparatus including a magnetic recording medium having a magnetic recording layer, a heater configured to heat the medium and a magnetic head configured to apply a magnetic field to the medium, comprising:

determining a stable retention time $t_{st}$ for recorded magnetization at room temperature and a thermal-fluctuation stability coefficient $\beta_{st}$ at room temperature calculated from a thermal-fluctuation stability coefficient β(T) at an absolute temperature T, expressed by the following equation:

$$\beta(T)=K_u V/k_B T,$$

where $K_u$ is a magnetic anisotropy energy density, V is an activation volume, and $k_B$ is Boltzmann's constant;

obtaining an equivalent degradation time $t_{EQ}$ calculated from the following equation:

$$t_{EQ}=\Sigma(\Delta t_{EQ}),$$

that sums values of $\Delta t_{EQ}$ within a given period of time $\Delta t$ for a time span during which the medium is kept at a temperature at which the recorded magnetization is substantially degraded, where $\Delta t_{EQ}$ is defined by the following equation:

$$\Delta t_{EQ}=\exp(\ln(\Delta t)-\beta+\beta_{st}),$$

where β is a thermal-fluctuation stability coefficient for a medium temperature T in the period of time βt; and determining specification of the magnetic recording medium, the heater and the magnetic head in a manner to meet the relationship of $t_{EQ} < t_{st}$ between the stable retention time $t_{st}$ for recorded magnetization at root temperature and the equivalent degradation time $t_{EQ}$.

9. The method according to claim 8, wherein the temperature at which the recorded magnetization is substantially degraded is defined to be a temperature not lower than room temperature plus 1/10 of the difference between room temperature and the highest temperature of a heated magnetic recording medium.

10. The Method according to claim 8, wherein the period of time $\Delta t$ is set to $t_i$ when $t_i$ falls within a range of between 1 ns and 10 ns, set to 10 ns when $t_i$ exceeds 10 ns, and set to 1 ns when $t_i$ is shorter than 1 ns, where $t_i$ is obtained by equally dividing by 10 the time span during which the medium is held at a temperature not lower than room temperature plus 1/10 of the difference between room temperature and the highest temperature of a heated magnetic recording medium.

11. The method according to claim 8, wherein the values of $\Delta t_{EQ}$ are summed for a time span after the formation of a magnetization transition on the medium.

12. The method according to claim 8, wherein the stable retention time t.sub.st for the recorded magnetization at room temperature is at least 5 years.

13. The method according to claim 8, wherein the thermal-fluctuation stability coefficient $\beta_{st}$ is 60 or more.

14. The method according to claim 8, wherein the equivalent degradation time tab meets the relationship of $t_{st}/10 < t_{EQ}$.

15. The method according to claim 8, wherein the neater is a laser.

16. The method according to claim 15, wherein a distance between the laser and a recording gap of the magnetic head is adjusted.

* * * * *